(12) United States Patent
Morimura et al.

(10) Patent No.: US 11,001,198 B2
(45) Date of Patent: May 11, 2021

(54) NOTIFICATION DEVICE

(71) Applicant: Toyota Jidosha Kabushiki Kaisha, Toyota (JP)

(72) Inventors: Junichi Morimura, Shizuoka-ken (JP); Tomoyuki Kuriyama, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/738,414

(22) Filed: Jan. 9, 2020

(65) Prior Publication Data

US 2020/0231087 A1    Jul. 23, 2020

(30) Foreign Application Priority Data

Jan. 17, 2019 (JP) .............................. JP2019-006042

(51) Int. Cl.
*B60Q 1/52* (2006.01)
*B60W 60/00* (2020.01)

(52) U.S. Cl.
CPC ............. *B60Q 1/52* (2013.01); *B60W 60/007* (2020.02); *B60W 60/0016* (2020.02)

(58) Field of Classification Search
CPC .......... B60Q 1/52; B60Q 1/302; B60Q 1/503; B60Q 1/46; B60Q 5/006; B60Q 1/18; B60Q 1/525; B60Q 1/0035; B60Q 5/005; B60Q 1/50; B60W 60/007; B60W 60/0016; B60W 40/10; B60R 16/0232; G09F 21/04

USPC ..... 340/471, 433, 425.5, 463, 464, 468, 470
See application file for complete search history.

(56) References Cited

U.S. PATENT DOCUMENTS

| | | | |
|---|---|---|---|
| 6,268,793 B1 * | 7/2001 | Rossi | B60Q 1/302 340/436 |
| 6,396,395 B1 * | 5/2002 | Zielinski | B60Q 1/50 180/271 |
| 6,556,903 B2 * | 4/2003 | Chinigo | B60R 22/48 340/433 |
| 6,819,051 B1 * | 11/2004 | Currie | B60Q 1/2611 307/10.8 |
| 2015/0042491 A1 * | 2/2015 | Burnison | B60Q 1/52 340/902 |
| 2017/0120803 A1 * | 5/2017 | Kentley | B60R 21/01 |
| 2018/0186283 A1 * | 7/2018 | Fischer | G07C 5/008 |

FOREIGN PATENT DOCUMENTS

| | | |
|---|---|---|
| JP | 2010-149768 A | 7/2010 |
| JP | 2015-074420 A | 4/2015 |

* cited by examiner

*Primary Examiner* — Anh V La
(74) *Attorney, Agent, or Firm* — Dinsmore & Shohl LLP

(57) ABSTRACT

A notification device provided in a vehicle including an autonomous driving system which causes the vehicle to travel by autonomous driving and to evacuate the vehicle when a failure occurs, includes a display unit configured to display information toward an outside of the vehicle, and a display controller configured to control the display unit. The display controller causes the display unit to be turned on or flicker when a failure occurs and changes a display of the display unit in at least one of a time when an evacuation starts and a time when an evacuation is completed.

16 Claims, 9 Drawing Sheets

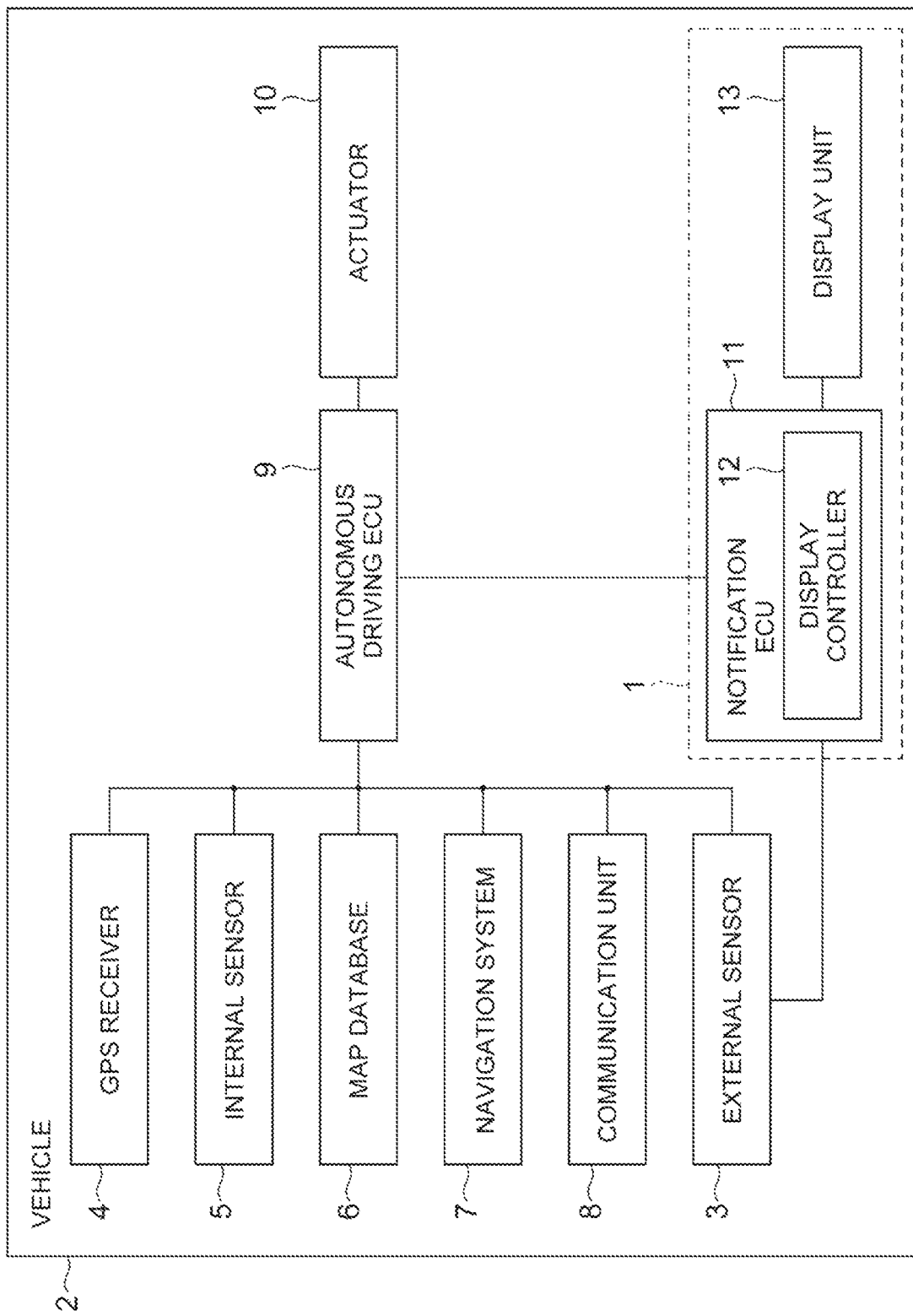

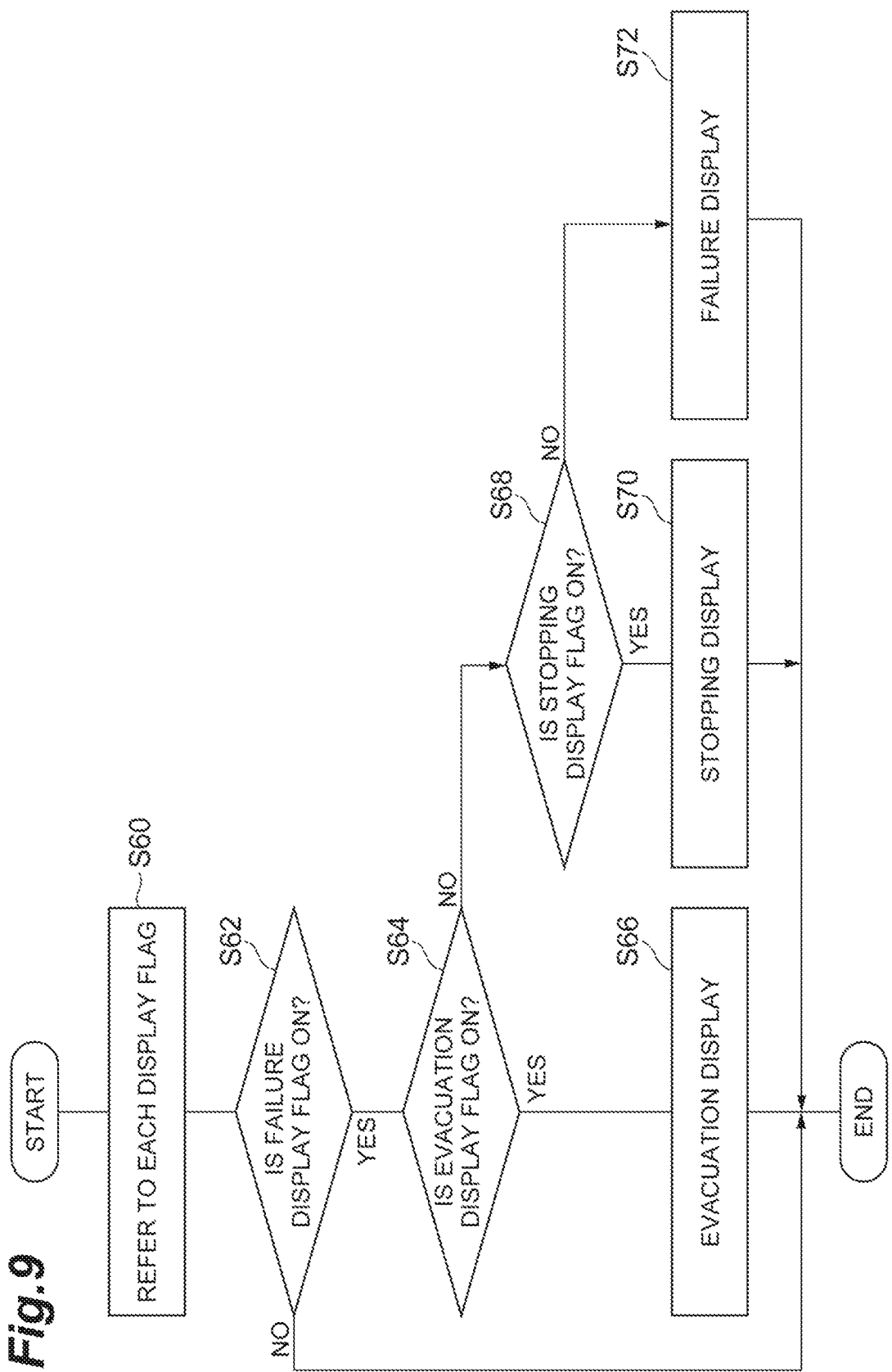

NOTIFICATION DEVICE

CROSS-REFERENCE TO RELATED APPLICATIONS

This application claims priority to Japanese Patent Application No. 2019-006042 filed on Jan. 17, 2019, and the entire contents of which are incorporated herein by reference.

TECHNICAL FIELD

The present disclosure relates to a notification device.

BACKGROUND

Japanese Unexamined Patent Publication No. 2015-074470 discloses a vehicle which causes a hazard lamp to flicker when an abnormality occurs.

SUMMARY

If a vehicle is an autonomous driving vehicle, it is considered to configure the autonomous driving vehicle such that when a failure occurs, an evacuation action is taken. For example, it is considered that an autonomous driving vehicle having a failure moves to a side of a road and the like by autonomous driving. However, the evacuation action is different behavior from normal traveling of the vehicle. Therefore, there is a concern that it is difficult for vehicles in the vicinity or pedestrians to predict how the vehicle moves.

The present disclosure provides a technique in which an outside of the vehicle is notified of behavior of a vehicle when the vehicle is evacuated by autonomous driving.

An aspect of the present disclosure is a notification device provided in a vehicle including an autonomous driving system which causes the vehicle to travel by autonomous driving and to evacuate the vehicle when a failure occurs. The notification device includes a display unit configured to display information toward an outside of the vehicle and a display controller configured to control the display unit. The display controller causes the display unit to be turned on or flicker when a failure occurs and changes a display of the display unit in at least one of a time when an evacuation starts and a time when an evacuation is completed.

In the notification device, the display unit is turned on or flickers when a failure occurs, and a display of the display unit is changed in at least one of the time when an evacuation starts and the time when an evacuation is completed. Therefore, in at least one of the time when an evacuation starts and the time when an evacuation is completed, the display unit is displayed with an aspect different from the aspect when a failure occurs. For this reason, the notification device can notify the outside of the vehicle that the evacuation action of the vehicle having failed is started or that the evacuation action of the vehicle having failed is completed after notifying the outside of the vehicle that the failure has occurred. Therefore, the notification device can notify the outside of the vehicle of the behavior of the vehicle when the vehicle is evacuated by autonomous driving.

In the notification device according to the aspect of the disclosure, the display controller may cause the display unit to flicker when a failure occurs and changes a flickering rate of the display unit in at least one of the time when an evacuation starts and the time when an evacuation is completed. In this case, the notification device can notify the outside of the vehicle that the evacuation action of the vehicle having failed is started or that the evacuation action of the vehicle having failed is completed by changing the flickering rate of the display unit after notifying the outside of the vehicle that the failure has occurred by flicker of the display unit.

In the notification device according to the aspect of the disclosure, the display controller may cause the display unit to flicker in a first cycle when a failure occurs and cause the display unit to flicker in a second cycle shorter than the first cycle when an evacuation starts. Generally, interest in the vicinity tends to be higher when the vehicle is evacuating than when the vehicle has a failure. The notification device can more emphatically perform the notification of the vehicle evacuating than the notification of the vehicle having a failure.

In the notification device according to the aspect of the disclosure, the display controller may cause the display unit to flicker in a third cycle longer than the second cycle when an evacuation is completed. In this case, the notification device can perform the notification of the evacuation action having high interest in the vicinity is completed by the fact that a cycle of flicker becomes long.

In the notification device according to the aspect of the disclosure, the display controller may cause the display unit to be turned on when an evacuation is completed. In this case, the notification device can perform the notification of the evacuation action having the high interest in the vicinity is completed by the fact that the display unit is switched from the light flickering, to the light turned on.

According to the various aspects and embodiments of the present disclosure, it is possible to notify the outside of the vehicle of the behavior of the vehicle when the vehicle is evacuated by autonomous driving.

BRIEF DESCRIPTION OF THE DRAWINGS

FIG. 1 is a functional block diagram of an example of a vehicle including a notification device according to an embodiment.

FIG. 9 is a flowchart illustrating an example of the operation of the notification device.

DETAILED DESCRIPTION

Figure 2A:
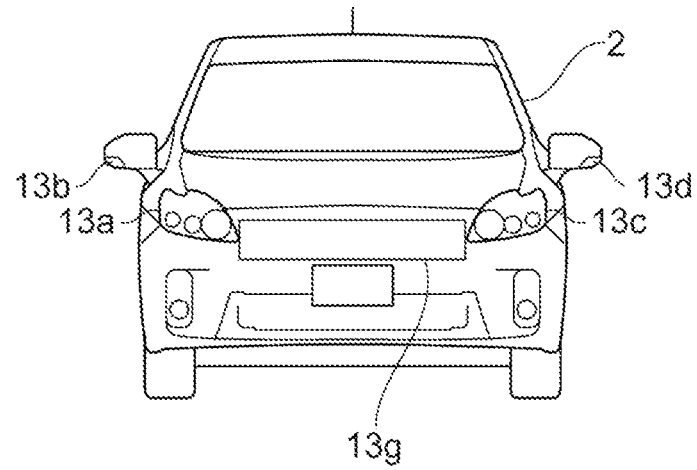
FIG. 2A is a diagram illustrating an example of an in-vehicle installation position of a display unit.

Hereinafter, an exemplary embodiment will be described with reference to drawings. In the following description, the same or corresponding elements are given the same reference numerals and repetitive description will not be repeated.

Configuration of Vehicle and Notification Device

FIG. 1 is a functional block diagram of an example of a vehicle 2 including a notification device 1 according to a first embodiment. As shown in FIG. 1, the notification device 1 is installed in the vehicle 2 such as a passenger car, and notifies vehicles in the vicinity which are present around the vehicle of information. The vehicle 2 includes, for example, the autonomous driving system. The autonomous driving system causes the vehicle 2 to travel by autonomous driving. Autonomous driving is vehicle control that causes the vehicle 2 to autonomously travel to a destination set in advance. The destination may be set by an occupant such as a driver and autonomously set by the vehicle 2. The autonomous driving may be vehicle control that causes the vehicle 2 to travel autonomously driven along the road without setting a destination. At the time of the autonomous driving, the driver does not need to perform a driving operation and the vehicle 2 travels autonomously.

The vehicle 2 is provided with an external sensor 3, a GPS receiver 4, an internal sensor 5, a map database 6, a navigation system 7, a communication unit 8, an autonomous driving ECU 9, and an actuator 10.

The external sensor 3 is a detecting machine that detects a situation in the vicinity of the vehicle 2. The external sensor 3 detects the position of an object in front of a roadway on which the vehicle 2 travels. The external sensor 3 includes at least one of a camera and a radar sensor.

The camera is an imaging machine that images a situation outside the vehicle 2. The camera is provided on a rear side of a windshield of the vehicle 2, for example. The camera acquires imaging information related to the situation outside the vehicle 2. The camera may be a monocular camera and may be a stereo camera. The stereo camera includes two imaging units that are disposed such that binocular parallax is realized. Imaging information of the stereo camera includes information in a depth direction also.

The radar sensor is a detecting machine that detects an object in the vicinity of the vehicle 2 by using a radio wave (for example, millimeter wave) or light. Examples of the radar sensor include a millimeter wave radar and a laser imaging detection and ranging (LIDAR). The radar sensor detects an object by transmitting a radio wave or light to the vicinity of the vehicle 2 and receiving the radio wave or light reflected by the object.

The GPS receiver 4 acquires position information indicating the position of the vehicle 2 by receiving signals from three or more GPS satellites. The position information includes latitude and longitude, for example. Instead of the GPS receiver 4, other means capable of specifying the latitude and the longitude of the vehicle 2 may also be used.

The internal sensor 5 is a detecting machine that detects a traveling state of the vehicle 2. The internal sensor 5 includes a vehicle speed sensor, an acceleration sensor, and a yaw rate sensor. The vehicle speed sensor is a measurer that measures the speed of the vehicle 2. As the vehicle speed sensor, for example, a vehicle wheel speed sensor that is provided with respect to vehicle wheels of the vehicle 2 or a drive shaft integrally rotating with the vehicle wheels and that measures the rotation speed of vehicle wheels is used.

The acceleration sensor is a measurer that measures the degree of acceleration of the vehicle 2. The acceleration sensor may include a front-rear acceleration sensor that measures the degree of acceleration of the vehicle 2 in a front-rear direction and a lateral acceleration sensor that measures the degree of acceleration of the vehicle 2. The yaw rate sensor is a measurer that measures the yaw rate (rotary angular speed) around the vertical axis of the center of gravity of the vehicle 2. As the yaw rate sensor, a gyro sensor can be used, for example.

The map database 6 is a storing device that stores map information. The map database 6 is stored in a hard disk drive (HDD) installed in the vehicle 2, for example. The map database 6 includes information of a stationary object, a traffic rule, and positions of a traffic signal. The stationary object is, for example, a road surface painting (including lane boundary lines such as white line and yellow line) and a structure (such as curb, pole, electric pole, building, sign, and tree). A part of the map information included in the map database 6 may be stored in a storing device different from the HDD in which the map database 6 is stored. A part of or the entire map information included in the map database 6 may be stored in a storing device other than a storing device provided in the vehicle 2.

The navigation system 7 is a system that guides a driver of the vehicle 2 to a destination set in advance. The navigation system 7 recognizes, based on the position of the vehicle 2 measured by the GPS receiver 4 and the map information in the map database 6, a traveling road and a traveling lane on which the vehicle 2 travels. The navigation system 7 calculates a target route from the position of the vehicle 2 to the destination and guides the driver along the target route by using a human machine interface (HMI).

The communication unit 8 is a machine for communicating with machines outside the vehicle. The communication unit 8 acquires information from other vehicles or a server by wireless communication.

The actuator 10 is a device that performs traveling control of the vehicle 2. The actuator 10 includes at least an engine actuator, a brake actuator, and a steering actuator. The engine actuator controls the driving force of the vehicle 2 by changing the amount of air supplied to an engine (for example, changing throttle opening degree) in accordance with a control signal from the autonomous driving ECU 9. The engine actuator controls the driving force of a motor functioning as a power source when the vehicle 2 is a hybrid vehicle or an electric vehicle.

The autonomous driving ECU 9 is a main component of the autonomous driving system. The autonomous driving ECU 9 controls the vehicle 2. The ECU is an electronic control unit that includes a central processing unit (CPU), a read only memory (ROM), a random access memory (RAM), a controller area network (CAN) communication circuit, or the like. The autonomous driving ECU 9 is connected to a network in which communication is performed by means of the CAN communication circuit and is connected to the above-described constituent elements of the vehicle 2 such that the autonomous driving ECU 9 can communicate with the constituent elements. The autonomous driving ECU 9 realizes an autonomous driving function by operating the CAN communication circuit such that data is input and output, storing the data in the RAM, loading a program stored in the ROM into the RAM, and executing the program loaded into the RAM, based on a signal output by the CPU, for example. The autonomous driving ECU 9 may include a plurality of electronic control units.

The autonomous driving ECU 9 recognizes an object (including position of object) in the vicinity of the vehicle 2 based on at least one of the result of detection performed by the external sensor 3 and the map database 6. Examples of the object include a dynamic object such as a pedestrian, a bicycle, and a non-host vehicle in addition to a stationary object such as an electric pole, a guardrail, a tree, and a building. The autonomous driving ECU 9 performs object recognition each time the result of detection is acquired from the external sensor 3, for example. The autonomous driving ECU 9 may recognize an object by using other known methods.

The autonomous driving ECU 9 detects a dynamic object from recognized objects by using the information of a stationary object included in the map database 6, for example. The autonomous driving ECU 9 may detect the dynamic objects by using other known methods.

The autonomous driving ECU 9 measures the movement quantity of the dynamic object at that time by applying a Kalman filter a particle filter, or the like with respect to the detected dynamic object. The movement quantity includes the movement direction and the movement speed of the dynamic object. The movement quantity may include the rotation speed of the dynamic object. In addition, the autonomous driving ECU 9 may perform movement quantity error estimation.

The autonomous driving ECU 9 recognizes the traveling state of the vehicle 2 based on the result of detection performed by the internal sensor 5 (for example, vehicle speed information of vehicle speed sensor, acceleration information of acceleration sensor, yaw rate information of yaw rate sensor, or like). The traveling state of the vehicle 2 includes, for example, the vehicle speed, the degree of acceleration, and the yaw rate.

The autonomous driving ECU 9 recognizes, based on the result of detection performed by the external sensor 3, boundary lines of a lane on which the vehicle 2 travels.

The autonomous driving ECU 9 generates the course of the vehicle 2 based on the result of detection performed by the external sensor 3, the map database 6, the recognized position of the vehicle 2 in a map, information about a recognized object (including lane boundary lines), and the recognized traveling state of the vehicle 2. At this time, the autonomous driving ECU 9 generates the course of the vehicle 2 while making an assumption about the behavior of an object in the vicinity of the vehicle 2. Examples of the assumption about the behavior of the object include an assumption that all of objects in the vicinity of the vehicle 2 are stationary objects, an assumption that a dynamic object moves independently, and an assumption that a dynamic object moves while interacting with at least one of another object and the vehicle 2.

The autonomous driving ECU 9 generates a plurality of candidates for the course of the vehicle 2 by using a plurality of assumptions. The candidates for the course include at least one course along which the vehicle 2, travels avoiding an objects. The autonomous driving ECU 9 selects one course by using the reliabilities of the candidates for the course or the like.

The autonomous driving ECU 9 generates a traveling plan in accordance with the selected course. The autonomous driving ECU 9 generates the traveling plan in accordance with the course of the vehicle 2 based on the result of detection performed by the external sensor 3 and the map database 6. The autonomous driving ECU 9 generates the traveling plan such that the speed limit for a traveling lane is not exceeded by using the speed limit stored in the map database 6. In addition, the autonomous driving ECU 9 generates the traveling plan in which the vehicle 2 travels such that a predetermined upper limit speed is not exceeded.

The autonomous driving ECU 9 outputs the traveling plan to be generated such that the course of the vehicle 2 has a plurality of combinations of two elements, the two elements being a target position p in a coordinate system fixed to the vehicle 2 and a speed V at each target point (that is, plurality of configuration coordinates (p, V)). Here, each target position p includes at least the X and Y coordinates thereof in the coordinate system fixed to the vehicle 2 or information equivalent thereto. Note that, the traveling plan is not particularly limited as long as the traveling plan described the behavior of the vehicle 2. Regarding the traveling plan, a target time t may be used instead of the speed V and the target time t and the orientation of the vehicle 2 at that time may be added to the traveling plan. The traveling plan may be data indicating how the vehicle speed, the degree of acceleration and deceleration, the steering torque, and the like of the vehicle 2 change when the vehicle 2 travels along the course. The traveling plan may include the speed pattern, the pattern of the degree of acceleration and deceleration, and the steering pattern of the vehicle 2.

The autonomous driving ECU 9 autonomously controls travel of the vehicle 2 based on the generated traveling plan. The autonomous driving ECU 9 outputs a control signal corresponding to the traveling plan to the actuator 10. In this manner, the autonomous driving ECU 9 controls travel of the vehicle 2 such that the vehicle 2 autonomously travels in accordance with the traveling plan.

The autonomous driving ECU 9 causes the vehicle 2 to travel by autonomous driving and monitors whether or not a failure occurs in the vehicle 2. The failure means a defect occurring in the component of the vehicle 2. An example of the defect includes a defect in which the autonomous driving cannot be continued after a predetermined time has elapsed, or a defect in which the autonomous driving cannot be continued without the degeneration function using an alternative means. A specific example of the defect includes cases in which the GPS receiver 4 or the communication unit 8 cannot receive information, detection function of the internal sensor 5 and the external sensor 3 is not performed, a tire has punctured, and the like. The autonomous driving ECU 9 determines, for example, whether or not there is an abnormality (error) of the vehicle 2 based on operation information or diagnosis information of the machines provided in the vehicle 2. The operation information is, for example, log information, and the diagnosis information is, for example, information (for example, status information and the like) obtained by a periodically executed command. The autonomous driving ECU 9 determines whether or not the vehicle 2 has a failure based on the number or degree of the abnormality occurring in the vehicle. If it is determined that the failure of the vehicle 2 is occurring, the autonomous driving ECU 9 cause the vehicle 2 to be evacuated. An evacuation means that the vehicle 2 moves to a position where the vehicle 2 does not interfere with traveling of other vehicles. The autonomous driving ECU 9 determines an evacuation position by using a functioning machine, and causes the vehicle to move to the evacuation position by the autonomous driving.

The notification device 1 includes a notification ECU 11 and a display unit 13. The notification ECU 11 is an electronic control unit that controls a display of information. The notification ECU 11 may be configured of a plurality of ECUs, or may be included in the autonomous driving ECU 9. The display unit 13 is a machine provided in the vehicle 2 and displaying information toward the outside of the vehicle. The display unit 13 is connected to the notification ECU 11 and displays information based on an output signal of the notification ECU 11.

Figure 2B:
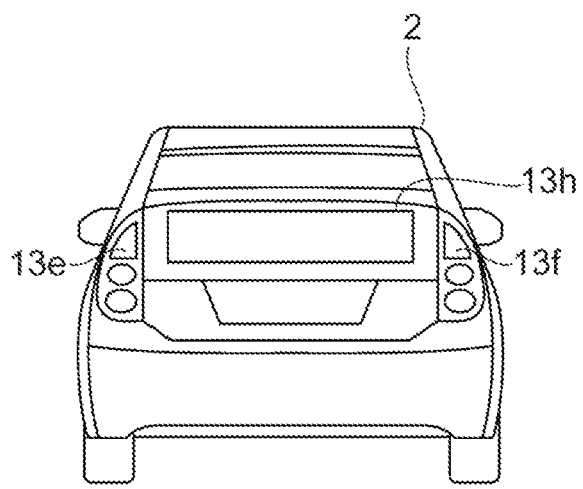
FIG. 2B is a diagram illustrating an example of an in-vehicle installation position of a display unit.
Figure 2C:
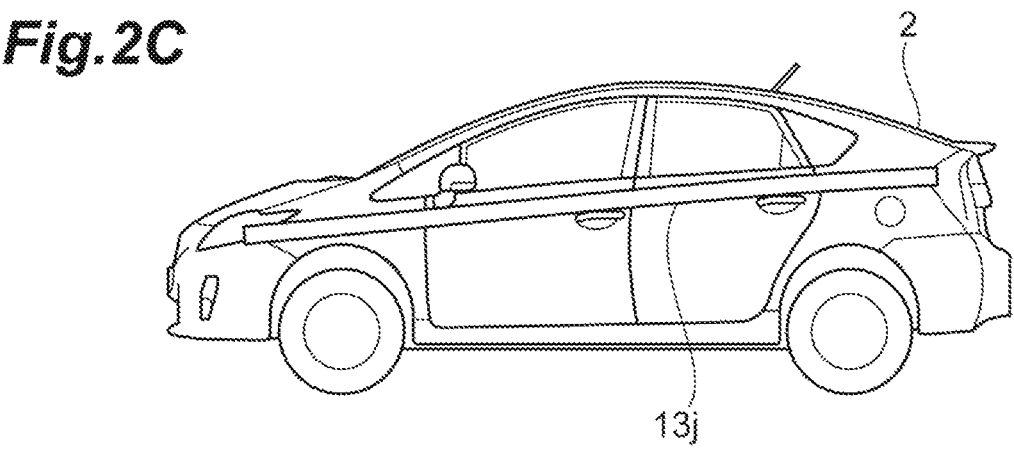
FIG. 2C is a diagram illustrating an example of an in-vehicle installation position of a display unit.

The display unit 13 is an example of a direction indicator. The display unit 13 is disposed at a position capable of being visually recognized at the front the rear or the side of the vehicle 2. FIG. 2A to 2C are diagrams illustrating an example of an in-vehicle installation position of the display unit. As shown in FIG. 2A, direction indicators 13a to 13d are provided on the front side and door mirrors of the vehicle 2 as the display unit 13. Additionally, as shown in FIG. 2B, direction indicators 13e and 13f are provided on the rear side of the vehicle 2 as the display unit 13.

The display unit 13 may be a display device. As shown in FIG. 2A, a front display device 13g is provided with a grille portion on the front side of the vehicle 2 as the display unit 13. As shown in FIG. 2B, a rear display device 13h is provided with the rear side of the vehicle 2 as the display unit 13. Furthermore, as shown in FIG. 2C, a side display device 13j is provided on the side of the vehicle 2 as the display unit 13. The display unit 13 is not limited to the example shown in FIGS. 2A-2C. A plurality of display devices may be provided with the grille portion on the front side of the vehicle 2 and may be provided on the rear side and the side of the vehicle 2.

The notification ECU 11 includes a display controller 12 controlling the display unit 13. When the failure does not occur, that is, normal autonomous driving is performed and the failure occurs, the display controller 12 changes control of the display of the display unit 13.

Display when Traveling by Normal Autonomous Driving

When traveling by normal autonomous driving, the display controller 12 controls direction indicators 13a to 13f based on an instruction from a driver or an autonomous driving ECU 9. For example, the display controller 12 causes direction indicators 13a, 13b, and 13f to flicker based on a lever operation of the driver or a direction instruction of the autonomous driving ECU 9 at the time of preparation of a right turn or lane change to the right. The display controller 12 causes direction indicators 13c, 13d, and 13e to flicker based on a lever operation of the driver or a direction instruction of the autonomous driving ECU 9 at the time of preparation of a left turn or lane change to the left. In addition, the display controller 12 causes the direction indicators 13a to 13f to flicker in the same cycle based on a hazard switch operation of the driver or the like, or a hazard instruction of the autonomous driving ECU 9 at the time of stopping.

When traveling by normal autonomous driving, the display controller 12 may change the display of the front display device 13g, the rear display device 13h, and the side display device 13j in accordance with a execution state of the autonomous driving. For example, the display controller 12 may cause the front display device 13g, the rear display device 13h, and the side display device 13j to be turned on during the autonomous driving, and to be turned off during no autonomous driving (that is, during a manual operation).

Display when Failure Occurs

A display controller 12 causes a display unit 13 to be turned on or flicker when a failure occurs. For example, the display controller 12 causes a display unit 13 to be turned on or flicker in accordance with a determination that the failure of a vehicle 2 has occurred. For example, when a failure occurs, the display controller 12 causes the direction indicators 13a to 13f to flicker in the same cycle. When a failure occurs, the display controller 12 may cause a front display device 13g, a rear display device 13h, and the side display device 13j to flicker in the same cycle. The display controller 12 may cause both a direction indicator and a display device to flicker, and may also cause only one of them to flicker. By being turned up or flickering the display unit 13, it is possible to notify the outside of the vehicle that a vehicle 2 has a failure.

If it is determined that the failure of the vehicle 2 is occurring, the autonomous driving ECU 9 cause the vehicle 2 to be evacuated. At this time, the display controller 12 changes the display of the display unit 13 in at least one of a time when an evacuation starts and a time when an evacuation is completed. Changing the display means changing an aspect of the display. The aspect of the display is changed by changing lighting state (light turned on, light flickering, light turned off), light intensity, flickering rate, lighting synchronization state, and the like in the light turned on. The aspect of the display may be changed by a lighting pattern combination of the direction indicator and the display device. For example, in a case of causing the direction indicator to flicker and causing the display device to turn off, changing of the display also includes a case of causing both the direction indicator and the display device to flicker. The display controller 12 changes the display unit 13 which is turned on or flickering to display an aspect different from the display when a failure occurs. By changing the display to be different from the display when a failure occurs, it is possible to notify the outside of the vehicle of the start timing of the evacuation and the completion timing of the evacuation of the vehicle 2.

For example, the display controller 12 may cause the display unit 13 to flicker when a failure occurs and may change the flickering rate of the display unit 13 in at least one of a time when an evacuation starts and a time when an evacuation is completed. Generally, interest in the vicinity is higher when the vehicle is evacuating than when the vehicle is being stopped. The flickering rate of the display unit 13 is changed when an evacuation starts, so that it can be indicated that the vehicle 2 is evacuating. As a specific example, the display controller 12 may cause the direction indicators 13a to 13f to flicker when a failure occurs, and may change the flickering rate of a part or all of the direction indicators 13a to 13f in at least one of a time when an evacuation starts and a time when an evacuation is completed. The front display device 13g, the rear display device 13h, and the side display device 13j can be controlled similarly.

The display controller 12 can emphatically display a fact that the vehicle 2 is evacuating. For example, the display controller 12 causes the display unit 13 to flicker in a first cycle when a failure occurs and causes the display unit 13 to flicker in a second cycle shorter than the first cycle when an evacuation starts. As a specific example, the display controller 12 causes the direction indicators 13a to 13f to flicker in the first cycle when a failure occurs and causes the direction indicators 13a to 13f to flicker in the second cycle when an evacuation starts. The front display device 13g, the rear display device 13h, and the side display device 13j can be controlled similarly.

The display controller 12 may indicate a traveling direction during the evacuation action by using the direction indicators 13a to 13f when the vehicle 2 takes the evacuation action accompanied by steering. For example, when the vehicle 2 moves in the right direction, the display controller 12 causes only the direction indicators 13a, 13b and 13f among the direction indicators 13a to 13f to be turned on or flicker. When emphatically displaying the evacuation accompanied by steering, the display controller 12 may cause the direction indicators 13a to 13f to flicker in the first cycle when a failure occurs, cause direction indicators 13c, 13d, and 13e to be turned off, and cause the direction indicators 13a, 13b, and 13f to flicker in the second cycle while moving to the right direction. In addition, the autonomous driving ECU 9 determines whether or not the evacuation action is accompanied by steering. For example, if the steering amount exceeds a predetermined threshold, it is determined that the evacuation action is accompanied by steering.

The display controller 12 may cause the display unit 13 to flicker in the third cycle longer than the second cycle when an evacuation is completed. The third cycle may be the same as the first cycle described above. In this case, the time when a failure occurs and the time when an evacuation is completed flicker in the same cycle. Alternatively, the display controller 12 may cause the display unit 13 to light up when an evacuation is completed.

As described above, by using at least one of the direction indicator and the display device, the display controller 12 can notify the outside of the vehicle of the timing when a failure occurs and the timing of at least one of a time when an evacuation starts and a time when an evacuation is completed. Hereinafter, an example of a specific driving scene and a display example of the display unit 13 in the driving scene are outlined, but the aspects of the display are not limited thereto.

Example of Display

Figure 3:
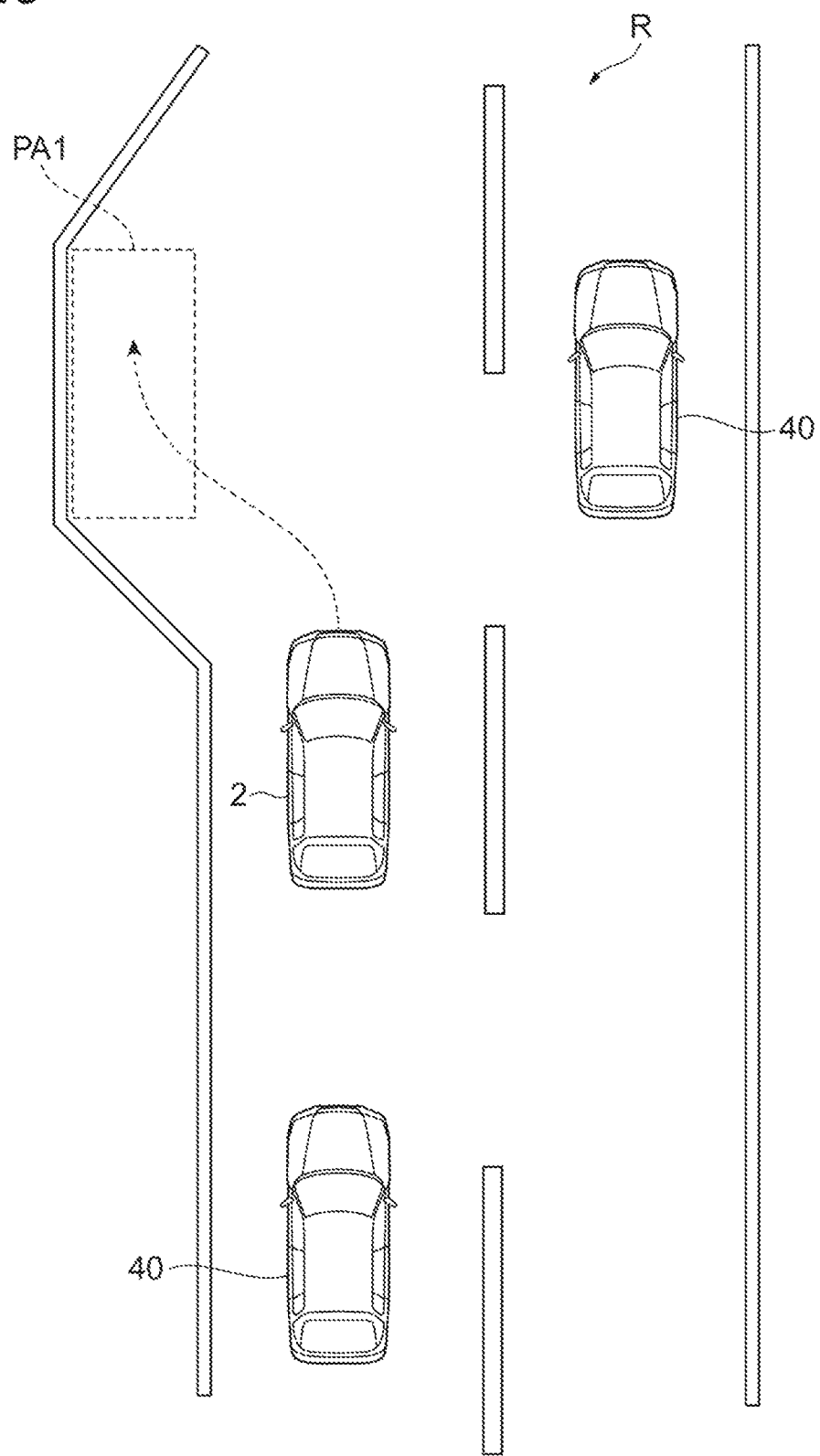
FIG. 3 is a diagram illustrating an example of a driving scene in which the notification device performs a notification.

FIG. 3 is a diagram illustrating an example of a driving scene in which a notification device performs a notification. As shown in FIG. 3, a vehicle 2 is traveling on a road R by autonomous driving. If a sensor failure or a tire puncture occurs in traveling by autonomous driving, the autonomous driving ECU 9 determines that the vehicle 2 has a failure. At this time, the autonomous driving ECU 9 may stop the vehicle 2 or continue traveling of the vehicle 2 in a state where a function is degenerated according to the degree of the failure. Subsequently, the autonomous driving ECU 9 determines an evacuation position. In the example shown in FIG. 3, the evacuation position PA1 which is a stopping space exists in the left front of the vehicle 2. The autonomous driving ECU 9 determines an evacuation traveling route which does not interfere with a vehicle 40 in the vicinity or road structures until the vehicle 2 moves to the evacuation position PA1. When the evacuation traveling route has been determined, the autonomous driving ECU 9 causes the vehicle 2 to start an evacuation action for evacuating, to the evacuation position PA1 along the evacuation traveling route. When the vehicle 2 is stopped at the evacuation position PA1, the autonomous driving ECU 9 determines that the evacuation action is completed.

Figure 4:
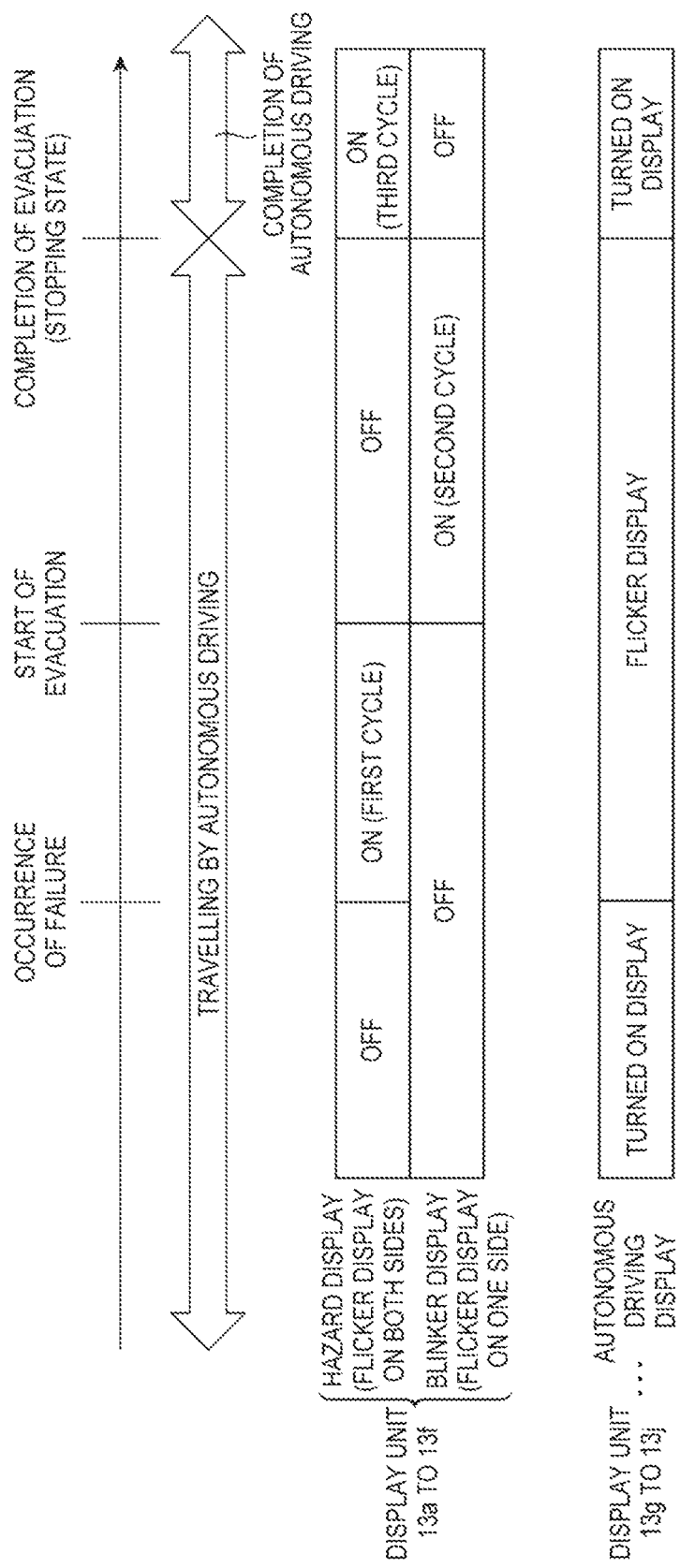
FIG. 4 is a diagram illustrating an example of a time chart of the display unit in the driving scene illustrated in FIG. 3.

FIG. 4 is a diagram illustrating an example of a time chart of a display unit in a driving scene illustrating in FIG. 3. In FIG. 4, a display pattern of a display unit 13 is shown in time series. As a display pattern of the direction indicators 13a to 13f, a hazard display and a blinker display are shown. The hazard display is a flickering display on both sides, and is an aspect of the display in which all the direction indicators 13a to 13f flicker are in the same cycle. The blinker display is a flickering display on one side, and is an aspect of the display in which only one side of the left and right among the direction indicators 13a to 13f flickers in the same cycle. The hazard display and the blinker display cannot be performed at the same time.

Before a failure occurs, the vehicle 2 normally travels by autonomous driving. For this reason, the direction indicators 13a to 13f are turned on when necessary. In the example of FIG. 3, it is assumed that the vehicle 2 is traveling on a straight road R, and any operation instruction of the driver is not received. In this case, as shown in FIG. 4, both the hazard display and the blinker display are turned OFF (not executed). A front display device 13g, a rear display device 13h, and a side display device 13j perform a display (turned on display) indicating that autonomous driving is being performed.

When a failure occurs, the direction indicators 13a to 13f start the hazard display (hazard display is turned ON). For example, the direction indicators 13a to 13f flicker synchronously in the first cycle. At this time, the blinker display is turned OFF (not executed). The front display device 13g, the rear display device 13h, and the side display device 13j start a display (flickering display) indicating that a failure is occurring.

After a predetermined time has elapsed from the occurrence of the failure, the direction indicators 13a to 13f change the display when the evacuation action caused by the autonomous driving ECU 9 is started. In the example of FIG. 3, the vehicle 2 takes the evacuation action accompanied steering when an evacuation starts. Therefore, the direction indicators 13a to 13f turn OFF the hazard display (not executed) and start the blinker display (turn ON blinker display). For example, the direction indicators 13a, 13b, and 13f flicker in the second cycle. At this time, the front display device 13g, the rear display device 13h, and the side display device 13j maintain a display (flickering display) indicating that a failure is occurring.

When an evacuation is completed, that is, when the vehicle 2 stops at the evacuation position PA1, the direction indicators 13a to 13f change the display. The direction indicators 13a to 13f turn OFF the blinker display (not executed) and start the hazard display (turn ON hazard display). For example, the direction indicators 13a to 13f flicker synchronously in the third cycle. The front display device 13g, the rear display device 13h, and the side display device 13j start a display (turned on display) indicating that the evacuation is completed.

As described above, the display of the display unit 13 is changed in accordance with the behavior of the vehicle 2 from the occurrence of the failure to the completion of the evacuation.

Other Example of Display

Figure 5:
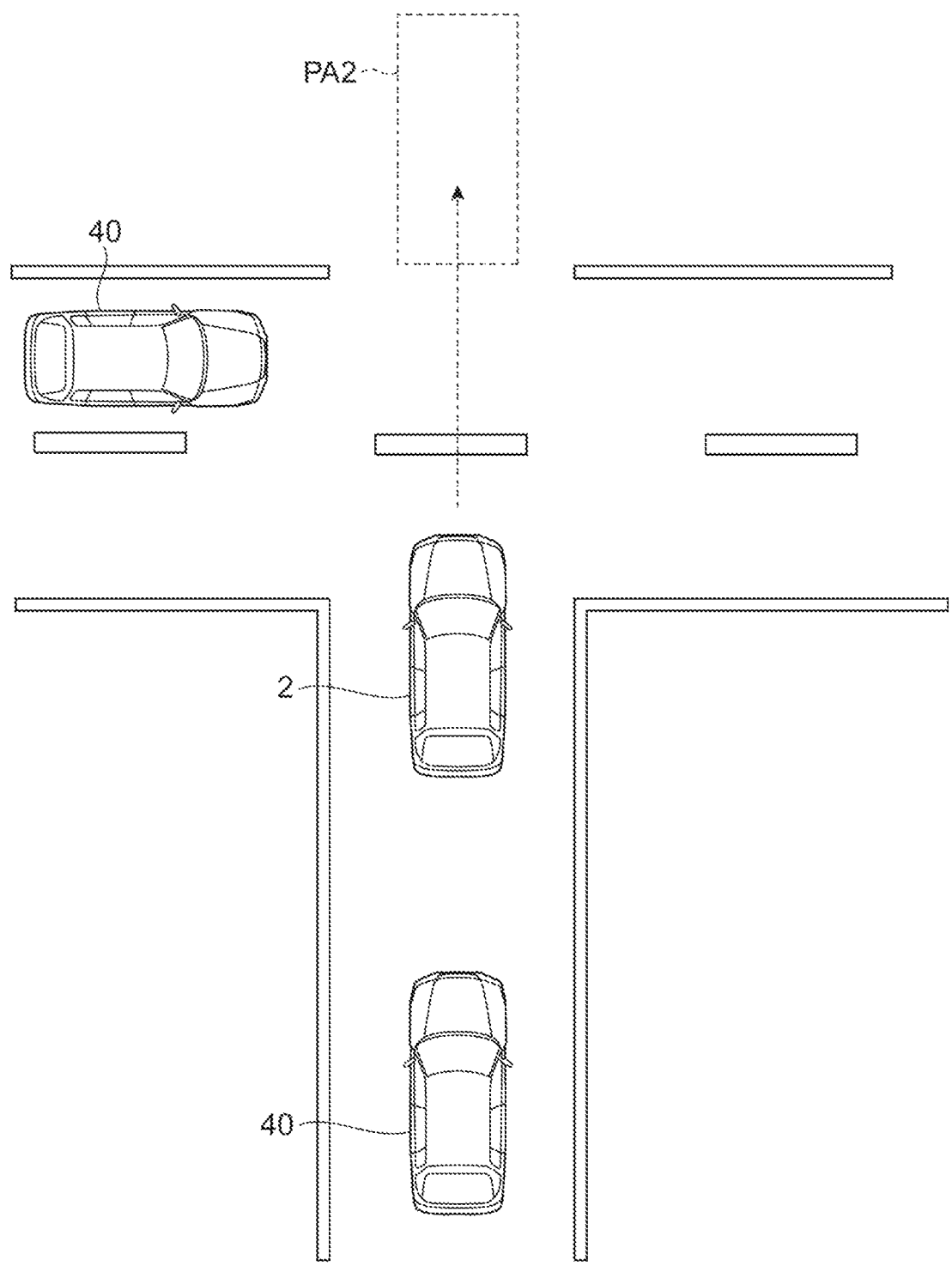
FIG. 5 is a diagram illustrating another example of a driving scene in which the notification device performs a notification.

FIG. 5 is a diagram illustrating another example of a driving scene in which a notification device performs a notification. As shown in FIG. 5, it is assumed that the vehicle 2 is traveling by autonomous driving and is stopped at a merging location. If a sensor failure or a tire puncture occurs in traveling by autonomous driving, the autonomous driving ECU 9 determines that the vehicle 2 has a failure. At this time, the autonomous driving ECU 9 determines an evacuation position. In the example shown in FIG. 5, an evacuation position PA2 which is a parking space exists in the front of the vehicle 2. The autonomous driving ECU 9 determines an evacuation traveling route which does not interfere with the vehicle 40 in the vicinity or road structures until the vehicle 2 moves to the evacuation position PA2. In the example of FIG. 5, the vehicle 2 stands by until the vehicle 40 in the vicinity traveling on the road of a merging destination passes in front of the vehicle 2. Thereafter, the vehicle 2 determines the evacuation traveling route in which the vehicle 2 goes straight and enters the evacuation position PA2. When the evacuation traveling route has been determined, the autonomous driving ECU 9 causes the vehicle 2 to start an evacuation action for evacuating to the evacuation position PA2 along the evacuation traveling route. When the vehicle 2 is stopped at the evacuation position PA2, the autonomous driving ECU 9 determines that the evacuation action is completed.

Figure 6:
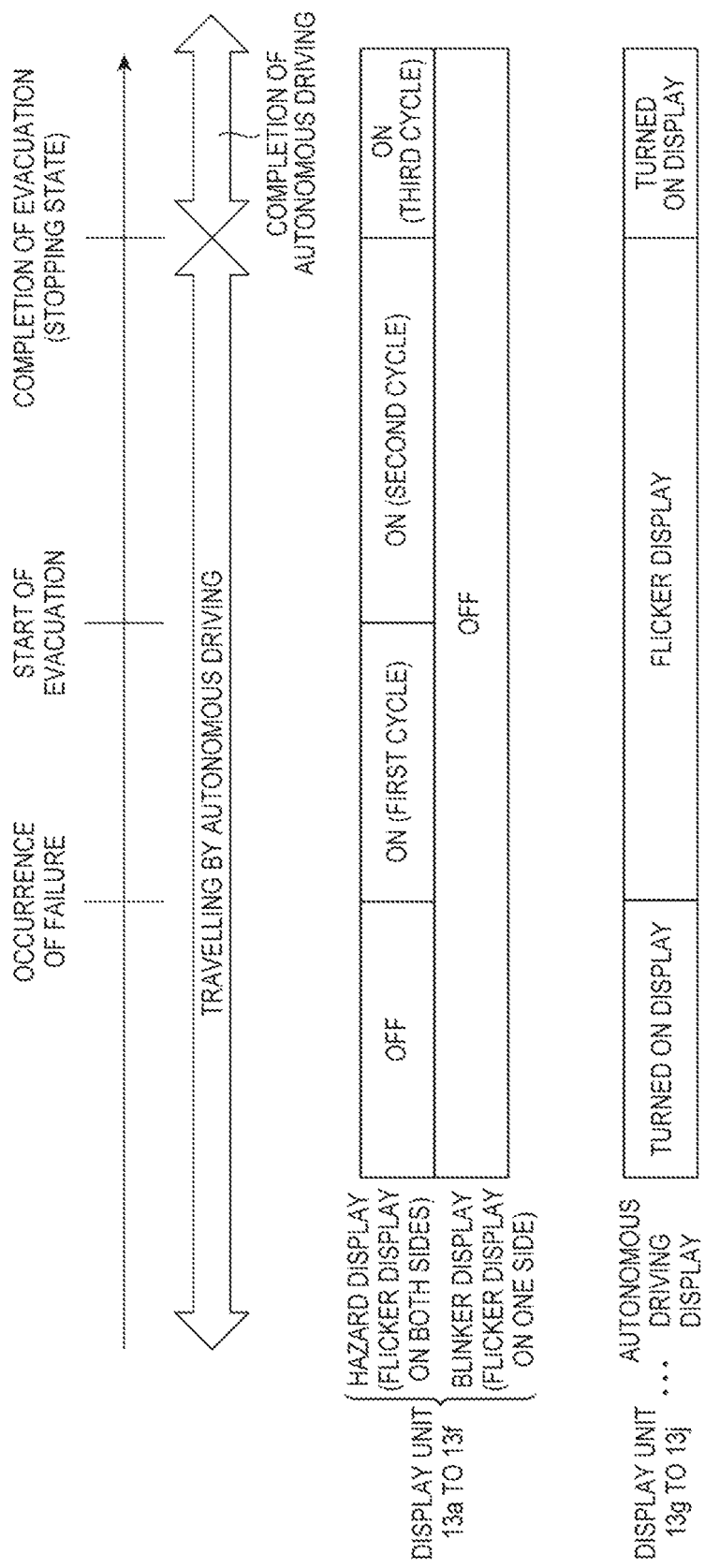
FIG. 6 is a diagram illustrating an example of a time chart of the display unit in the driving scene illustrated in FIG. 5.

FIG. 6 is a diagram illustrating an example of a time chart of a display unit in a driving scene illustrating in FIG. 5. In FIG. 6, a display pattern of a display unit 13 is shown in time series.

Before a failure occurs, the vehicle 2 normally travels by autonomous driving. For this reason, the direction indicators 13a to 13f are turned on when necessary. In the example of FIG. 5, it is assumed that the vehicle 2 does not receive any operation instruction of the driver. In this case, as shown in FIG. 6, both the hazard display and the blinker display are turned OFF (not executed). A front display device 13g, a rear display device 13h, and a side display device 13j perform a display (turned on display) indicating that autonomous driving is being performed.

When a failure occurs, the direction indicators 13a to 13f start the hazard display (hazard display is turned ON). For example, the direction indicators 13a to 13f flicker synchronously in the first cycle. At this time, the blinker display is turned OFF (not executed). The front display device 13g, the rear display device 13h, and the side display device 13j start a display (flickering display) indicating that a failure is occurring.

After a predetermined time has elapsed from the occurrence of the failure, the direction indicators 13a to 13f change the display when the evacuation action caused by the autonomous driving ECU 9 is started. In the example of FIG. 5, the vehicle 2 takes the evacuation action without steering. For this reason, the direction indicators 13a to 13f continue the hazard display. For example, the direction indicators 13a to 13f flicker in the second cycle. At this time, the front display device 13g, the rear display device 13h, and the side display device 13j maintain a display (flickering display) indicating that a failure is occurring.

When an evacuation is completed, that is, when the vehicle 2 stops at the evacuation position PA2, the direction indicators 13a to 13f change the display. The direction indicators 13a to 13f continue the hazard display. For example, the direction indicators 13a to 13f flicker in the third cycle. The front display device 13g, the rear display device 13h, and the side display device 13j start a display (turned on display) indicating that the evacuation is completed.

As described above, the display of the display unit 13 is changed in accordance with the behavior of the vehicle 2 the occurrence of the failure to the completion of the evacuation.

Example of Operation

Figure 7:
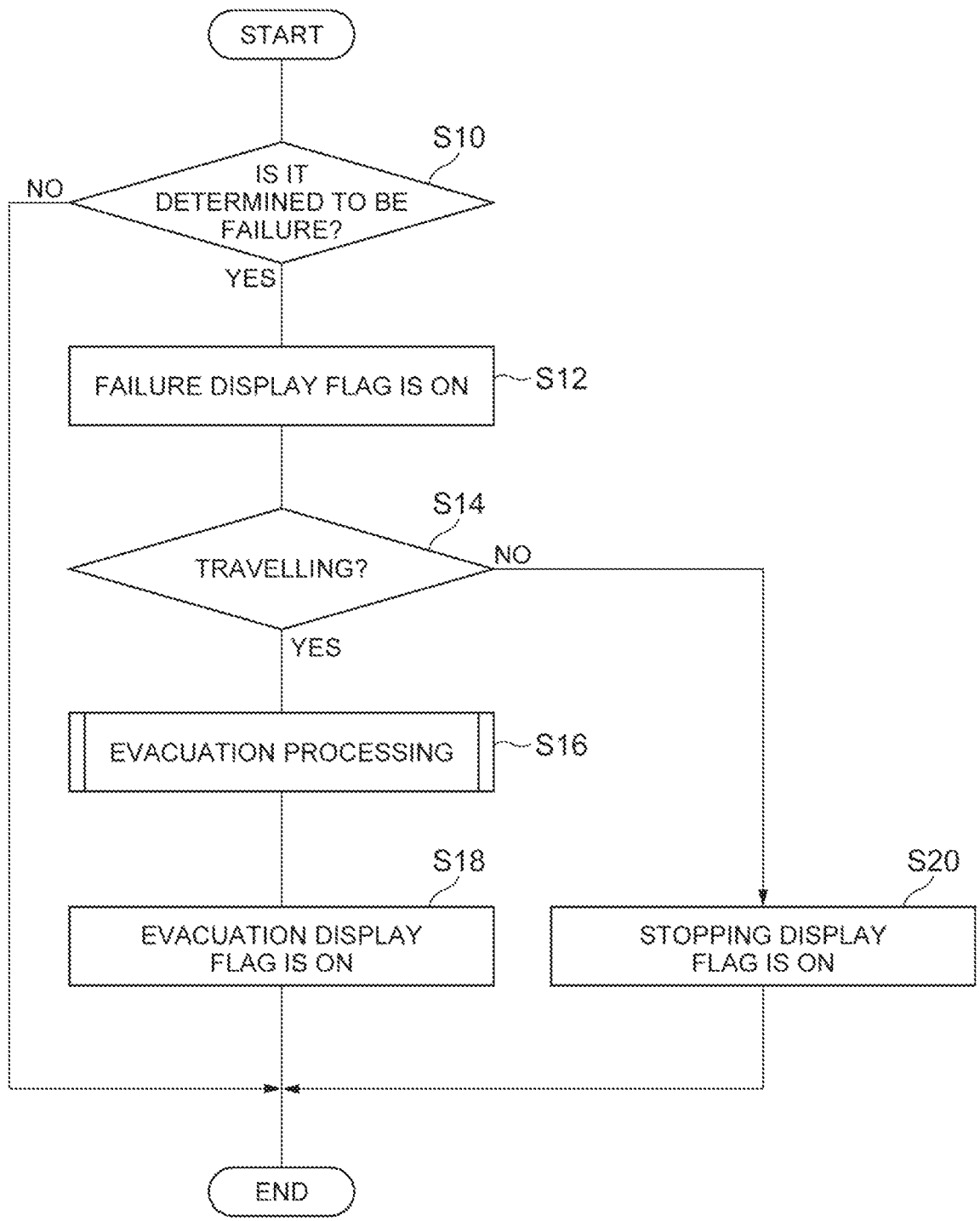
FIG. 7 is a flowchart illustrating an example of an evacuation operation by autonomous driving.

FIG. 7 is a flowchart illustrating an example of an evacuation operation by autonomous driving. The flowchart shown in FIG. 7 is executed by an autonomous driving ECU 9. For example, the autonomous driving ECU 9 starts processing when an autonomous driving start button is turned ON by an operation of a driver.

As shown in FIG. 7, the autonomous driving ECU 9 determines whether or not the vehicle 2 has a failure via failure judgment processing (step S10). The autonomous driving ECU 9 determines whether or not there is an abnormality (error) of the vehicle 2 based on operation information or diagnosis information of machines provided in the vehicle 2. The autonomous driving ECU 9 determines whether or not the vehicle 2 has a failure based on the number or degree of the abnormality occurring in the vehicle.

If it is determined that a failure has occurred (step S10: YES), the autonomous driving ECU 9 changes a failure display flag from OFF to ON (step S12). The failure display flag is a flag referred to by the display controller 12 in processing described later, and is used to determine whether or not to display a failure. When the failure display flag is turned ON information indicating that a failure has occurred is displayed on the display unit 13 by the display controller 12. When the failure display flag is turned OFF, information indicating that a failure has occurred is not displayed.

Subsequently, the autonomous driving ECU 9 determines whether or not the vehicle 2 is traveling (step S14). The autonomous driving. ECU 9 determines whether or not the vehicle 2 is traveling based on the result of detection of the internal sensor 5. For example, when the detected value of the speed sensor is not equal to or less than a predetermined threshold, the autonomous driving ECU 9 determines that the vehicle 2 is traveling.

If it is determined that the vehicle 2 is traveling (step S14: YES), the autonomous driving ECU 9 causes the vehicle 2 to start an evacuation action by performing a calculation necessary for the evacuation action of the vehicle 2 via evacuation processing (step S16). Details of the evacuation processing will be described later.

Subsequently, the autonomous driving ECU 9 changes an evacuation display flag from OFF to ON (step S18). The evacuation display flag is a flag referred to by the display controller 12 in the processing described later, and is used to determine whether or not to display the evacuation. When the evacuation display flag is turned ON, information indicating that the evacuation is being performed is displayed on the display unit 13 by the display controller 12. When the evacuation display flag is turned OFF, information indicating that the evacuation is being performed is not displayed.

If it is determined that the vehicle 2 is not traveling (step S14: NO), the autonomous driving ECU 9 changes a stopping display flag from OFF to ON (step S20). The stopping display flag is a flag referred to by the display controller 12 in the processing described later, and is used to determine whether or not to display stopping. When the stopping display flag is turned ON, information indicating that a vehicle is stopping is displayed on the display unit 13 by the display controller 12. When the stopping display flag is turned OFF, information indicating that the vehicle is stopping is not displayed.

If it is determined that a failure has not occurred (step S10: NO), if the evacuation display flag has been turned on (step S18), and if the stopping display flag has been turned on (step S20), the flowchart shown in 7 ends. The autonomous driving ECU 9 executes the flowchart shown in FIG. 7 from the beginning until a predetermined end condition is satisfied. The predetermined end condition is, for example, that the autonomous driving end button is turned ON by an operation of a driver.

The failure display flag, the evacuation display flag, and the stopping display flag are changed by executing the flowchart shown in FIG. 7 in accordance with the behavior of the vehicle 2.

Details of Evacuation Processing

Figure 8:
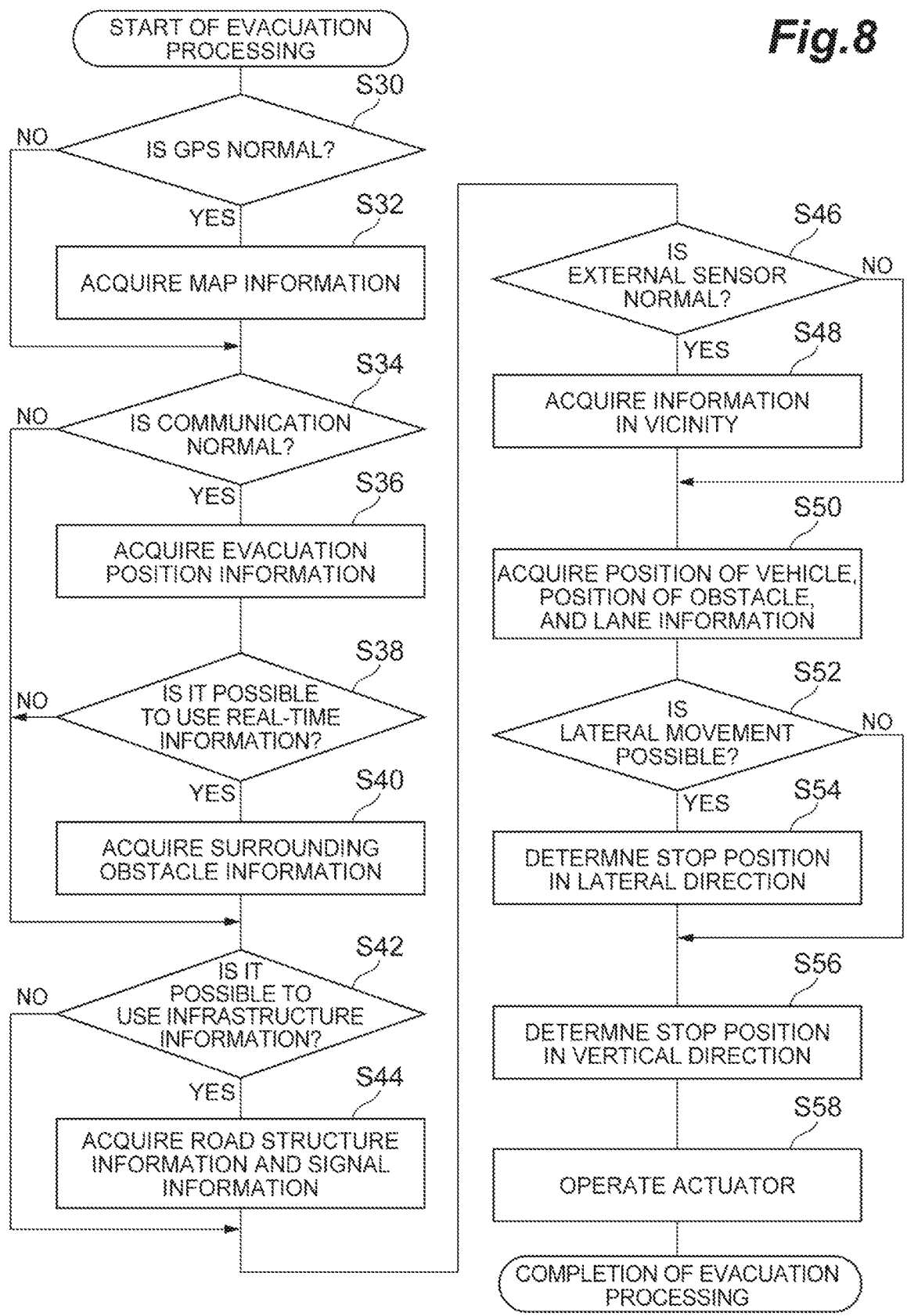
FIG. 8 is a flowchart illustrating an example of evacuation processing.

FIG. 8 is a flowchart illustrating an example of evacuation processing. As shown in FIG. 8, an autonomous driving ECU 9 determines whether or not a GPS is normal based on operation information or diagnosis information (step S30). If it is determined that the GPS is normal (step S30: YES), the autonomous driving ECU 9 acquires map information based on the self position by the GPS (step S32).

If it is determined that the GPS is not normal (step S30: NO) and if the processing, of step S32 is completed, the autonomous driving ECU 9 determines whether or not the communication with an external device such as a server is normal (step S34) based on operation information or diagnosis information. If it is determined that the communication is normal (step S34: YES), the autonomous driving ECU 9 acquires evacuation position information via a communication unit 8 (step S36). For example, the autonomous driving ECU 9 receives the evacuation position information from a server.

Subsequently, the autonomous driving ECU 9 determines whether or not a use of real-time information is possible (step S38). For example, the autonomous driving ECU 9 determines whether or not a use of the real-time information is possible by inquiring the server of the communication destination about presence or absence of the real-time information. Alternatively, the autonomous driving ECU 9 acquires whether or not the server at the communication destination has real-time information in advance and stores the information in the storage unit of the ECU. The autonomous driving ECU 9 refers to the storage unit to determine whether or not the use of the real-time information is possible.

If it is determined that the use of the real-time information is possible (step S38: YES), the autonomous driving ECU 9 acquires obstacle information in the vicinity via the communication unit 8 (step S40). For example, the autonomous driving ECU 9 receives the information on a dynamic obstacle of the vehicle 2 from the server.

If it is determined that the communication is not normal (step S34: NO), the use of the real-time information is not possible (step S38: NO), and if the processing of step S40 is completed, the autonomous driving ECU 9 determines whether or not it is possible to use infrastructure information (step S42). For example, based on the operation information or the diagnosis information, the autonomous driving ECU 9 determines whether or not a receiving function of the infrastructure information of the communication unit 8 is normal. Alternatively, the autonomous driving ECU 9 determines whether or not there is a transmitter such as a light beacon in the vicinity. If it is determined that the use of the infrastructure information is possible (Step S42: YES), the autonomous driving ECU 9 acquires road structure information and signal information via the communication unit 8 (Step S44). For example, the autonomous driving ECU 9 acquires the road structure information and the signal information via the light beacon and the like disposed on the roadside.

If it is determined that the use of the infrastructure, information is not possible (step S42: NO) and if the processing of step S44 is completed, the autonomous driving ECU 9 determines whether or not the external sensor 3 is normal. (Step S46). If it is determined that the external sensor 3 is normal (step S46: YES), the autonomous driving ECU 9 acquires information in the vicinity via the external sensor 3 (step S48).

If it is determined that the external sensor 3 is not normal (step S46: NO) and if the processing of step S48 is completed, the autonomous driving ECU 9 acquires, based on the information obtained in the processing so far, a position of the vehicle, a position of the obstacle, and lane information (step S50).

Subsequently, the autonomous driving ECU 9 determines whether or not a lateral movement of the vehicle 2 is possible (step S52). For example, it is determined that the lateral movement is possible based on the position of the vehicle, the position of the obstacle, and the lane information when the autonomous driving ECU 9 is movable such that the vehicle 2 does not cross the opposite lane without contacting with the obstacle.

If it is determined that the lateral movement of the vehicle 2 is possible (step S52: YES), the autonomous driving ECU 9 determines a stop position in the lateral direction (that is, an evacuation position in the lateral direction) (step S54). When the evacuation position information is acquired, the autonomous driving ECU 9 sets the coordinates of the evacuation position as the stop position in the lateral direction. When the evacuation position information is not acquired, the autonomous driving ECU 9 determines the evacuation position based on the result of the external sensor 3, infrastructure information, and the like, and sets the coordinates of the evacuation position as the stop position in the lateral direction. The evacuation position in the lateral direction may be zero. In this case, the vehicle moves in a longitudinal direction and stops.

If it is determined that the lateral movement of the vehicle 2 is not possible (step S52: NO) and if the processing of step S54 is completed, the autonomous driving ECU 9 determines the stop position in the longitudinal direction (step S56). When the evacuation position information is acquired, the autonomous driving ECU 9 sets the coordinates of the evacuation position as the stop position in the longitudinal direction. When the evacuation position information is not acquired, the autonomous driving ECU 9 determines the evacuation position based on the result of the external sensor 3, infrastructure information, and the like, and sets the coordinates of the evacuation position as the stop position in the longitudinal direction.

Subsequently, the autonomous driving ECU 9 cause an actuator 10 to be operated based on the determined lateral movement position and longitudinal movement position (step S58). Thereby, the evacuation action of the vehicle 2 is started. When the evacuation action of the vehicle 2 is started, the flowchart shown in FIG. 8 is completed.

Operation of Notification Device

FIG. 9 is a flowchart illustrating an example of the operation of the notification device. A process as in the flowchart shown in FIG. 9 is performed by the notification ECU 11 of the notification device 1. The notification ECU 11 starts the process when a notification start button is turned ON due to an operation of a driver or the like.

As shown in FIG. 9, a display controller 12 of the notification ECU 11 refers to each display flag (step S60). The display controller 12 refers to a failure display flag, an evacuation display flag, and a stopping display flag.

Subsequently, the display controller 12 determines whether or not the failure display flag is turned ON (step S62). If it is determined that the failure display flag is turned ON (step S62: YES), the display controller 12 determines whether or not the evacuation display flag is turned ON (step S64).

If it is determined that the evacuation display flag is not turned ON (step S64: NO), the display controller 12 determines whether or not the stopping display flag is turned ON (step S68). If it is determined that the stopping display flag is not turned ON (step S68: NO), the display controller 12 causes the display unit 13 to display a failure display (step S72). For example, the display controller 12 causes the direction indicators 13*a* to 13*f* to display hazards in a first cycle, and causes the front display device 13*g*, the rear display device 13*h*, and the side display device 13*j* to flicker.

If it is determined that the evacuation display flag is turned ON (step S64: YES), the display controller 12 causes the display unit 13 to display an evacuation display (step S66). For example, the display controller 12 causes direction indicators 13a to 13f to display hazards in a second cycle, and causes a front display device 13g, a rear display device 13h, and a side display device 13j to flicker continually. When steering occurs, the display controller 12 causes the direction indicators 13a to 13f to display a blinker in the second cycle.

If it is determined that the stopping display flag is turned ON (step S68: YES), the display controller 12 causes the display unit 13 to display a stopping display (step S70). For example, the display controller 12 causes direction indicators 13a to 13f to display hazards in a third cycle, and causes a front display device 13g, a rear display device 13h, and a side display device 13j to be turned on.

If it is determined that the failure display flag is not turned ON (step S62: NO) and the evacuation display (step S66), the stopping display (step S70), and the failure display (S72) are completed, the flowchart shown in FIG. 9 is completed. The display controller 12 executes the flowchart shown in FIG. 9 from the beginning until a predetermined end condition is satisfied. The predetermined end condition is, for example, a condition in which the notification completion button is turned ON by an operation of a driver.

If all the determination processing (steps S30, S34, S42, and S46) related to the information acquisition shown in FIG. 8 are negative, the information necessary for the evacuation cannot be obtained. Therefore, the autonomous driving ECU 9 stops the processing after step S50 in FIG. 8 and determines to stop the vehicle 2 at the current position. In this case, since the evacuation action is not taken, the display controller 12 maintains the display of the display unit 13 when a failure occurs.

Hereinabove, in the notification device 1, the display unit 13 is turned on or flickers when a failure occurs and the display of the display unit 13 is changed in at least one of the time when an evacuation starts and the time when an evacuation is completed. Therefore, in at least one of the time when an evacuation starts and the time when an evacuation is completed, the display unit 13 is displayed with an aspect different from the aspect when a failure occurs. For this reason, the notification device 1 can notify the outside of the vehicle that the evacuation action of the vehicle 2 having failed is started or that the evacuation action of the vehicle 2 having failed is completed after notifying the outside of the vehicle that the failure has occurred. Thus, the notification device 1 can perform the notification of the behavior of the vehicle 2 to the outside of the vehicle when the vehicle 2 is evacuated by the autonomous driving.

The notification device 1 can notify the outside of the vehicle that the evacuation action of the vehicle 2 having failed is started or that the evacuation action of the vehicle 2 having failed is completed by changing the flickering rate of the display unit 13 after notifying the outside of the vehicle that the failure has occurred by the display unit 13 flickering.

The notification device 1 can more emphatically perform the notification of the vehicle 2 evacuating than the notification of the vehicle having a failure.

The notification device 1 can notify the outside of the vehicle that the evacuation action having a high interest in the vicinity has completed, by the fact that the flicker cycle of the display unit 13 has become long, or that the flicker has been switched from the light flickering to the light turned on.

Hereinabove, various exemplary embodiments have been described. However, the disclosure is not limited to the above-described exemplary embodiments and various omissions, substitutions, and modifications may be made.

For example, the display unit 13 does not need to be provided outside the vehicle 2 and may be provided at a position inside the vehicle such as a position inward of the windshield as long as it is possible to perform notification about information toward the outside of the vehicle. The display unit 13 may perform notification about information by using letters. The display unit 13 is not limited to a display device and may be a light source device such as a lamp. In this case, the display unit 13 can perform notification about information with the light turned on state thereof. Alternatively, the display unit 13 may be a projector that displays an optical painting on a road surface. In this case, the display unit 13 can project, onto a road surface, information to be displayed by a display device.

What is claimed is:

1. A notification device provided in a vehicle including an autonomous driving system which causes the vehicle to travel by autonomous driving and to evacuate the vehicle when a failure occurs, the device comprising:
a display unit configured to display information toward an outside of the vehicle; and
a display controller configured to control the display unit,
wherein the display controller causes the display unit to be turned on or flicker when a failure occurs and changes a display of the display unit in at least one of a time when an evacuation starts and a time when the evacuation is completed.

2. The notification device according to claim 1,
wherein the display controller causes the display unit to flicker when the failure occurs and changes a flickering rate of the display unit in at least one of the time when the evacuation starts and the time when the evacuation is completed.

3. The notification device according to claim 1,
wherein the display controller causes the display unit to flicker in a first cycle when the failure occurs and causes the display unit to flicker in a second cycle shorter than the first cycle when the evacuation starts.

4. The notification device according to claim 3,
wherein the display controller causes the display unit to flicker in a third cycle longer than the second cycle when the evacuation is completed.

5. The notification device according to claim 3,
wherein the display controller causes the display unit to be turned on when the evacuation is completed.

6. A vehicle comprising:
an autonomous driving system which causes the vehicle to travel by autonomous driving and to evacuate the vehicle when a failure occurs;
a display unit configured to display information toward an outside of the vehicle; and
a display controller configured to control the display unit,
wherein the display controller causes the display unit to be turned on or flicker when a failure occurs and changes a display of the display unit in at least one of a time when an evacuation starts and a time when the evacuation is completed.

7. The vehicle according to claim 6,
wherein the display controller causes the display unit to flicker when the failure occurs and changes a flickering rate of the display unit in at least one of the time when the evacuation starts and the time when the evacuation is completed.

8. The vehicle according to claim 6,
wherein the display controller causes the display unit to flicker in a first cycle when the failure occurs and causes the display unit to flicker in a second cycle shorter than the first cycle when the evacuation starts.

9. The vehicle according to claim 8,
wherein the display controller causes the display unit to flicker in a third cycle longer than the second cycle when the evacuation is completed.

10. The vehicle according to claim 8,
wherein the display controller causes the display unit to be turned on when the evacuation is completed.

11. A method for notifying information toward an outside of a vehicle having an autonomous driving system, the method comprising:
a display controlling process which causes a display unit to display information,
wherein the display unit is provided in the vehicle and configured to display information toward the outside of the vehicle, and
wherein the display controlling process causes the display unit to be turned on or flicker when a failure occurs and changes a display of the display unit in at least one of a time when an evacuation of the vehicle by the autonomous driving system starts and a time when the evacuation is completed.

12. The method according to claim 11,
wherein the display controller causes the display unit to flicker when the failure occurs and changes a flickering rate of the display unit in at least one of the time when the evacuation starts and the time when the evacuation is completed.

13. The method according to claim 11,
wherein the display controller causes the display unit to flicker in a first cycle when the failure occurs and causes the display unit to flicker in a second cycle shorter than the first cycle when the evacuation starts.

14. The method according to claim 13,
wherein the display controller causes the display unit to flicker in a third cycle longer than the second cycle when the evacuation is completed.

15. The method according to claim 13,
wherein the display controller causes the display unit to be turned on when the evacuation is completed.

16. The method according to claim 11, wherein the autonomous driving system causes the vehicle to travel by autonomous driving.

* * * * *

UNITED STATES PATENT AND TRADEMARK OFFICE
CERTIFICATE OF CORRECTION

PATENT NO. : 11,001,198 B2
APPLICATION NO. : 16/738414
DATED : May 11, 2021
INVENTOR(S) : Junichi Morimura and Tomoyuki Kuriyama It is certified that error appears in the above-identified patent and that said Letters Patent is hereby corrected as shown below:

In the Specification

In Column 1, Line(s) 17 & 18, delete "2015-074470" and insert --2015-074420--, therefor.

In Column 2, Line(s) 30, after "flickering", delete ",".

In Column 5, Line(s) 53, after "vehicle 2", delete ",".

In Column 5, Line(s) 54, delete "objects" and insert --object--, therefor.

In Column 7, Line(s) 6, after "front", insert --,--.

In Column 9, Line(s) 46 & 47, after "evacuating", delete ",".

In Column 10, Line(s) 21 & 22, delete "accompanied steering", insert --accompanied by steering--, therefor.

In Column 11, Line(s) 47, after "vehicle 2", insert --from--.

In Column 12, Line(s) 11, after "driving", delete ".".

In Column 12, Line(s) 66, after "processing", delete ",".

In Column 13, Line(s) 49, after "infrastructure", delete ",".

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*